W. G. AND G. V. WADE.
STEERING STRAIN RELIEVING DEVICE FOR AUTOMOBILES.
APPLICATION FILED APR. 22, 1918.

1,305,635.

Patented June 3, 1919.

INVENTORS.
W. G. Wade.
G. V. Wade.

By Fetherstonhaugh &Co
Attys

UNITED STATES PATENT OFFICE.

WILLIAM GEORGE WADE, OF ST. CATHARINES, AND GEORGE VINCENT WADE, OF DUNDAS, ONTARIO, CANADA.

STEERING-STRAIN-RELIEVING DEVICE FOR AUTOMOBILES.

1,305,635.  Specification of Letters Patent.  Patented June 3, 1919.

Application filed April 22, 1918. Serial No. 230,161.

*To all whom it may concern:*

Be it known that we, WILLIAM GEORGE WADE, of St. Catharines, in the county of Lincoln, and GEORGE VINCENT WADE, of Dundas, in the county of Wentworth, Province of Ontario, Canada, have invented certain new and useful Improvements in Steering-Strain-Relieving Devices for Automobiles, of which the following is the specification.

Our invention relates to improvements in steering strain relieving device for automobiles and the object of the invention is to provide a device particularly adaptable for use in light automobiles whereby the steering mechanism will be held in any position to which it is turned until moved from such position by the operation of the steering wheel by the driver and which thereby takes all strain off the hands of the driver and obviates the danger of the wheels being turned out of their proper course when passing over rough ground and thereby avoiding the danger of accident from this cause and it consists essentially of the following arrangement and construction of parts as hereinafter more particularly explained.

In the drawings like characters of reference indicate corresponding parts in the various figures.

Figure 1:
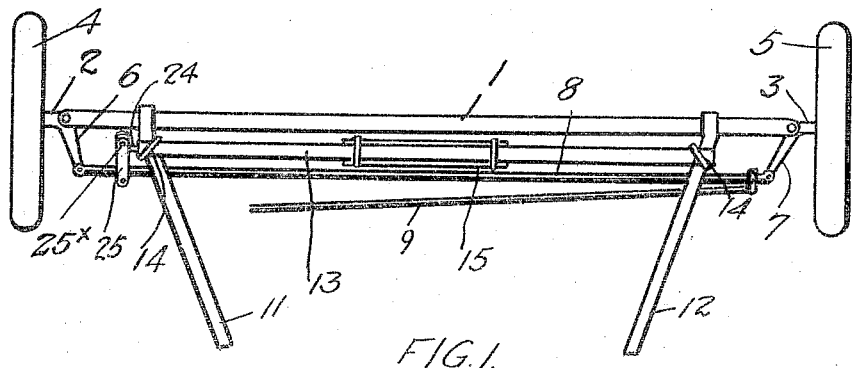
Figure 1 is a plan view showing the front axle assembly and adjacent parts of an automobile.
Figure 2:
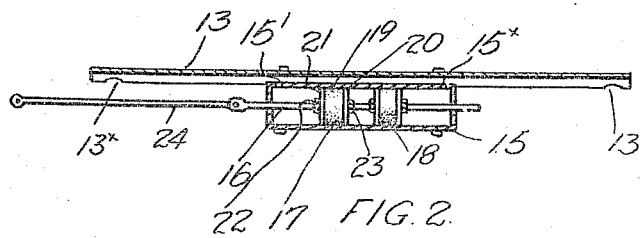
Fig. 2 is a longitudinal section through our steering strain relieving device.
Figure 3:
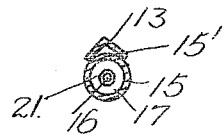
Fig. 3 is a cross section through Fig. 2.

1 indicates the front axle, to the ends of which are pivoted in the usual manner the axle arms 2 and 3 carrying the front wheels 4 and 5. 6 and 7 indicate spindle arms extending rearwardly from the axle arms. 8 indicates a spindle connecting rod connecting the arms 6 and 7 together. 9 indicates the steering gear connecting rod which is attached to the spindle connecting rod in the usual manner and is operated by the steering post of the automobile according to the practice commonly in use.

11 and 12 indicate the radius rods which are connected at their front ends to the axle 1. 13 indicates a cross bar which is inverted V-shape in cross section and is provided in proximity to its ends with notches 13×. The bar 13 rests upon the radius rods 11 and 12 so that the notches 13× fit over the upper portions of such rods. The bar 13 is then clamped in position by any suitable means such as U-bolts indicated at 14.

15 indicates a cylinder which is secured to the bar 13 intermediately of its length and is provided in proximity to each end thereof with air vents 15× and 15′ over which the inverted V-bar 13 extends so as to form a free outlet or inlet for the air.

16 indicates a piston rod which extends longitudinally through the center of the cylinder 15 and is provided with a pair of pistons 17 and 18. Each piston 17 or 18 comprises a central portion 19 formed of comparatively hard felt or other suitable material, the side plates 20 and 21 bearing against each face of the portion 19 and securing nuts 22 and 23 which are screwed upon the piston rod 16 against the plates 20 and 21. The pistons 17 and 18 are adjusted apart a suitable distance, one of the pistons being first set in position, a locking nut 23 being then set in position upon the rod 16 and the other piston forced up against such nut, the piston 17 being then secured in position by the nut 22. By this means a body of air between the pistons is compressed so as to have a frictional contact with the inner face of the wall of the cylinder 15. The compression of the felt 19 between the plates 20 and 21 also serves to expand the felt and frictionally grip the inner face of the cylinder 15.

24 indicates a link rod connected to the piston 16. 25 indicates a clamping member clamped upon the spindle connecting rod 8 and pivotally connected at 25× to the link 24.

When the steering mechanism is operated and the wheels 4 and 5 are turned to the required angle through the steering rod 9 connected to the spindle connecting rod 8 the spindle connecting rod being connected by the clamping member 25 and link 24 to the piston rod 16 draws such piston rod in a corresponding direction thereby moving the pistons 17 and 18 within the cylinder. The frictional contact of these pistons with the walls of the cylinder and the intervening compressed air holds these pistons in position, the leverage exerted upon the wheels 4 and 5 when passing over rough ground is insufficient to move the pistons 17 and 18 longitudinally within the cylinder thereby such wheels are held in the required position to which they have been turned. The proportionate leverage exerted upon the steering wheel when turned by the hand of the operator is so great that the pistons 17 and 18 are easily moved without any noticeable extra exertion on the part of the operator.

It will, therefore, be seen that the driver of the automobile can turn the wheels to any desired position. When they are turned to such position they will hold from swerving no matter what the nature of the ground is over which they are passing and there will be no strain or vibration upon the hands of the driver in holding the car in its desired course.

In practice it has been found by the drivers of light automobiles to be a very great disadvantage, the hands of the operator becoming very tired in the endeavor to hold the wheels and, therefore, rendering it liable that such wheels passing over rough ground will be turned from their course and thereby carrying the automobile out of its path and thereby making it liable for accidents to occur.

Although we have shown the spindle connecting rod as connected only to one end of the piston rod 16 it will, of course, be understood that in a right hand car it might be connected to the opposite end or if desired the spindle connecting rod might be connected to both ends of the piston rod.

From this description it will be seen that we have devised a very simple device whereby the steering mechanism of an automobile will be unaffected by the passage of the car over rough ground and thereby preventing the unnecessary exertion that occurs to a driver of a light car in holding the car in its proper course. It will be seen, however, that under all circumstances the driver of the car may turn the steering mechanism and that it will hold in any desired position. Of course it is impossible for the position of the running wheels to be changed except through the steering wheel.

What we claim as our invention is:

1. In an automobile steering strain relieving device the combination with the wheels, the spindle arms, and the spindle arm connecting rod, of a cylinder rigidly secured to a cross portion of the running gear other than the spindle arm connecting rod and adapted to lie rigidly parallel to the axle and provided with end air vents, a piston and piston rod, an arm secured to the spindle connecting rod and a link rod connecting the piston to the arm.

2. In an automobile steering strain relieving device the combination with the wheels, the spindle arms, and the spindle arm connecting rod, of a cylinder rigidly supported on the frame parallel to the axle and provided with end air vents, a double piston having a yielding central felt portion to each member, a piston rod, an arm secured to the spindle connecting rod and a link rod connecting the piston to the arm.

WILLIAM GEORGE WADE.
GEORGE VINCENT WADE.

Witnesses:
W. H. BATES,
GERTRUDE NICHOLSON.

Copies of this patent may be obtained for five cents each, by addressing the "Commissioner of Patents, Washington, D. C."